(12) United States Patent
Firestone et al.

(10) Patent No.: US 10,187,200 B1
(45) Date of Patent: Jan. 22, 2019

(54) SYSTEM AND METHOD FOR GENERATING A MULTI-STAGE KEY FOR USE IN CRYPTOGRAPHIC OPERATIONS

(71) Applicant: Secure Channels, Inc., Irvine, CA (US)

(72) Inventors: Adam C. Firestone, Alexandria, VA (US); Hilary L. MacMillan, Ashburn, VA (US)

(73) Assignee: SECURE CHANNELS INC., Irvine, CA (US)

( * ) Notice: Subject to any disclaimer, the term of this patent is extended or adjusted under 35 U.S.C. 154(b) by 0 days.

(21) Appl. No.: 15/881,648

(22) Filed: Jan. 26, 2018

Related U.S. Application Data

(60) Provisional application No. 62/607,263, filed on Dec. 18, 2017.

(51) Int. Cl.
*H04L 9/06* (2006.01)
*H04L 29/06* (2006.01)
*H04L 9/08* (2006.01)

(52) U.S. Cl.
CPC .......... *H04L 9/0618* (2013.01); *H04L 9/0869* (2013.01); *H04L 63/0435* (2013.01)

(58) Field of Classification Search
CPC .................................................. H04L 9/0618
USPC ......................................................... 380/46
See application file for complete search history.

(56) References Cited

U.S. PATENT DOCUMENTS

| 6,185,304 | B1 * | 2/2001 | Coppersmith | .......... H04L 9/002 380/259 |
| 7,827,408 | B1 * | 11/2010 | Gehringer | ............. H04L 9/0631 380/259 |
| 9,537,657 | B1 * | 1/2017 | Char | ..................... H04L 9/3226 |
| 2009/0080647 | A1 * | 3/2009 | Mantin | ................ H04L 9/0637 380/29 |
| 2009/0279697 | A1 * | 11/2009 | Schneider | ............. H04L 9/0637 380/37 |
| 2017/0279603 | A1 * | 9/2017 | Chen | ....................... H04L 9/065 |

* cited by examiner

*Primary Examiner* — Khalil Naghdali
(74) *Attorney, Agent, or Firm* — Rutan & Tucker, LLP

(57) ABSTRACT

A computerized method that encrypts each of a plurality of segments of a binary value using a selected block cipher of a plurality of block ciphers and a unique symmetric key of a first plurality of unique, symmetric keys to produce a first ciphertext. The method further encrypts each of a plurality of segments of the first ciphertext using a selected block cipher of the plurality of block ciphers and a unique symmetric key of a second plurality of unique, symmetric keys to produce a second ciphertext. The selected block cipher used to encrypt a first segment of the binary value to produce a first segment of the plurality of segments of the first ciphertext is different than the selected block cipher used to encrypt the first segment of the ciphertext to produce a first encrypted segment of the second ciphertext.

12 Claims, 12 Drawing Sheets

SYSTEM AND METHOD FOR GENERATING A MULTI-STAGE KEY FOR USE IN CRYPTOGRAPHIC OPERATIONS

CROSS-REFERENCE TO RELATED APPLICATIONS

This application claims the benefit of priority of U.S. Provisional Application No. 62/607,263, filed Dec. 18, 2017, the entire contents of which are incorporated by reference herein.

EXPORT CONTROL

Information in this patent application is controlled by the U.S. Government and authorized for access only by U.S. persons and licensed non-U.S. persons. Please contact the assignee, Secure Channels, Inc., for further guidance if you wish to give access to the subject application to a non-U.S. person. This statement attaches to any use or incorporation of said patent application into other applications or any other use.

1. FIELD

Embodiments of the disclosure relate to the field of cryptography. More specifically, an embodiment of the disclosure is directed to cryptographic logic configured to conduct iterative segmenting, encrypting and layering operations on incoming data to generate ciphertext for protected storage and/or transmission.

2. GENERAL BACKGROUND

The use of electronic data and other information has become an integral part of our daily lives. Each day, more and more emails, texts, electronic documents, and other forms of electronic data are stored or transmitted throughout the world by businesses and individuals alike. Accordingly, there exists an increasing need to protect the confidentiality of information contained within the electronic data from unauthorized disclosure.

In some cases, this electronic data may include sensitive data, such as bank account statements, credit card numbers, trade or government secrets, intellectual property or personally identifiable or protected healthcare information (e.g., medical histories, social security information, etc.), which has intrinsic value to both legitimate and non-legitimate actors. For some types of sensitive data, the protection of its confidentiality is more than just prudent, it is a legal requirement. For example, the Health Insurance Portability and Accountability Act (HIPAA) outlines legal requirements for maintaining the confidentiality of personal health information, where legal non-compliance may result in civil or criminal penalties, reputation damage, or legal action.

Encryption is one technique for protecting the confidentiality of information from eavesdroppers or other unauthorized parties. The goal of encryption is not to hide the existence of such information, but rather, to hide its meaning. Hence, encrypted data includes data that has been obfuscated according to a selected cryptographic key and cryptographic cipher. By obfuscating the data, the confidentiality is assured and the data is rendered computationally (as opposed to information-theoretically) secure. That is, although an attacker may theoretically break a scheme by enumerating all possible keys, the confidentiality of the data is protected when it is considered infeasible for the attacker to uncover data as plaintext (e.g., non-encrypted data) from stored or transmitted ciphertext (e.g., encrypted data) in any reasonable amount of time given available computing power. This notion of confidentiality for an encryption scheme is that it prevents "message-recovery attacks."

In the past, prior cryptography techniques have been configured to prevent unauthorized access to the data by third parties. While some prior cryptography techniques can, in fact, be very difficult to attack and bypass, such techniques have remained vulnerable to attack for several reasons. Some of these reasons may include the fact that many of these prior cryptography techniques use only (i) a single cipher when encrypting the data or (ii) a single key to encrypt all of the data in a message.

In the past, the use of a single key and/or cipher applied across the entirety of a message has aided attackers in bypassing the benefits associated with using such cryptographic techniques, especially where the key length is sufficiently short to allow the key to be (relatively) easily uncovered. More specifically, if a cryptographic algorithm features a key space that is too small, there is an increased probability of the key being discovered by an exhaustive key search, namely a "brute force attack." Such an attack tests every possible key until it finds the right one. For example, a 56-bit key space for the Data Encryption Standard (DES) algorithm has been recently determined to be inadequate, given that customized application specific integrated circuit (ASICs) may be developed to uncover a key in approximately 26 hours.

Also, the use of a single key to encrypt data has often been ineffective in preserving confidentiality as the encrypted data becomes vulnerable to key recovery or side channel attacks against vulnerabilities in an encryption algorithm, protocol, or implementation. Additionally, cryptanalysts (i.e., people who specialize in finding weaknesses in cryptosystems) routinely discover vulnerabilities innate to cryptosystems themselves. In some situations, the vulnerability may emerge, at least in part, because of technological advances (e.g., increased data processing capabilities, quantum computing, or the like). In others, widely used encryption schemes and cryptosystems (e.g., RC4 stream cipher) may be determined to be vulnerable due to inherent design characteristics. In either case, continued use of these encryption schemes (or cryptosystems) would not be recommended as the totality of the data may be compromised if a brute-force attack is conducted.

Given these many threats to data security, improvements in cryptographic schemes to protect such data are continually needed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
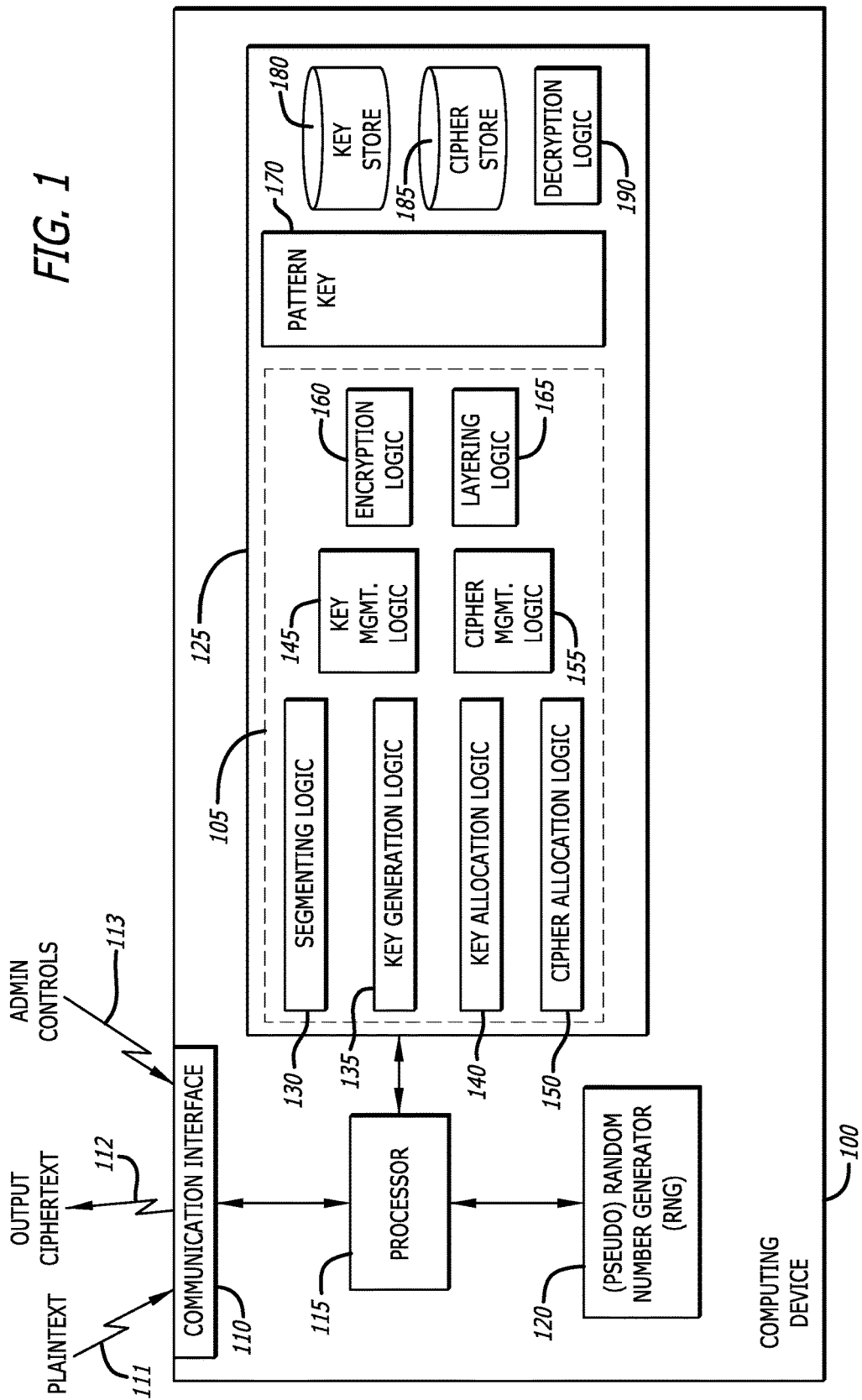
FIG. 1 is a first exemplary embodiment of a computing device deploying a multi-stage data protection logic.

Protecting information security is critical in today's information intensive society. Verifying information's authenticity to provide trustworthiness and protecting the confidentiality of such information are essential. In many different environments, sensitive data and information needs to be securely stored for later retrieval and/or transmitted from one location to another. As described below, cryptographic logic has been developed that provides a multi-stage data protection (encryption/decryption) scheme offering significant improvements in the degree of cryptographic assurances available from symmetric block ciphers such as the Advanced Encryption Standard (AES).

According to one embodiment of this disclosure, the multi-stage data protection scheme utilizes a plurality of block ciphers, which provide improved security guarantees over the use of a single conventional block cipher such as the AES or ARIA for example. By layering (e.g., common orientation) multiple block ciphers with respect to the encryption of discrete segments of plaintext, this multi-stage data protection scheme provides "fallback security" in case one or more of the block ciphers is compromised. Additionally, the multi-stage data protection scheme provides an effective key length which is significantly longer than that of any of the constituent block ciphers. Also, through the use of iterative layering, segmenting and encrypting operations, this multi-stage data protection scheme is further hardened against message recovery attacks in efforts to uncover the underlying data.

It is contemplated that the methods, functionality and features described herein may be embodied in whole or in part as software or firmware (defined below), which operates on any computing device or on a distributed system deploying one or more computing devices. Alternatively, it is contemplated that the methods, functionality and features described herein may be embodied, in whole or in part, as hardware.

I. Terminology

In the following description, certain terminology is used to describe aspects of the invention. For example, in certain situations, the terms "logic" and "component" are representative of hardware, firmware and/or software that is configured to perform one or more functions. As hardware, logic (or a component) may include circuitry having data processing or storage functionality. Examples of such processing or storage circuitry may include, but is not limited or restricted to the following: a processor; one or more processor cores; a programmable gate array; an I/O controller (e.g., network interface controller, disk controller, memory controller, keyboard controller, etc.); an application specific integrated circuit; receiver, transmitter and/or transceiver circuitry; semiconductor memory; combinatorial logic, or combinations of one or more of the above components.

Logic (or a component) may be in the form of one or more software modules, such as executable code in the form of an operating system component, an executable application, firmware, an application programming interface (API), one or more subroutines, a function, a procedure, an applet, a plug-in, a servlet, a Component Object Model (COM) object, a routine, source code, object code, a shared library/ dynamic linked library, a script, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or a semiconductor memory. As firmware, the executable code is stored in persistent storage.

The term "plaintext" refers generally to information, data or any other content in an unencrypted format, which may be included as part of a message, namely information that is stored or transmitted in accordance with a prescribed format. Hence, each "message" may be one or more packets or frames, a file, or any collection of bits having the prescribed format. As used herein, the term "ciphertext" includes information, data or any other content in an encrypted format.

An "encryption layer" is a result produced by encrypting input data (e.g. binary values of plaintext, ciphertext, etc.), where a first encryption layer denotes ciphertext produced by encrypting binary data associated with plaintext and a second encryption layer is produced from the ciphertext of the first encryption layer. Herein, when illustrating a multi-layered ciphertext, while the uppermost encryption layer is physically present, the logical relationship between the uppermost encryption layer and any lower encryption layers may be shown for illustrative purposes.

A "computing device" generally refers to an electronic device with access to plaintext via a communication interface (e.g., a network interface controller, wireless transceiver, memory controller, a physical or logical port, etc.). Examples of a computing device may include, but are not limited or restricted to the following: a server; a router or other signal propagation networking equipment (e.g., a wireless or wired access point); a set-top box; a video-game console; an endpoint device (e.g., a stationary or portable computer including, a desktop computer, laptop, electronic reader, netbook or tablet; a smart phone; or wearable technology such as an Apple® iWatch™, Fitbit® fitness wristband, or other sensor-based component).

The term "interconnect" is a physical or logical communication path to or within a computing device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that corresponding operations are conducted by hardware in combination with software and/or firmware.

The term "segment" may be construed as a collection of bits forming a predetermined length. This predetermined length may be determined, based at least in part, on (i) the size of the original plaintext message provided for encryption and (ii) padding requirements caused by the block size of a chosen block cipher (e.g., the amount of padding needed to produce an input plaintext length that is evenly divisible by the cipher block size such as 128 bits). Hence, a segment may include one or more "blocks" of data encrypted by a chosen block cipher. Examples of the cipher block sizes may include, but are not limited or restricted to 64 bits, 128 bits, 256 bits, or the like. Also, the number of segments may be selected based on the desired security level (e.g., 256 segments per encrypted message layer). To achieve fallback security, each segment is configured with the same length (size) as the other segments.

A "block cipher" is an encryption scheme that produces ciphertext from plaintext in which a cryptographic key and algorithm are applied to a block of data (for example, 128 contiguous bits) at once as a group rather than to one bit at a time. Different block ciphers may be used. By way of example only, and not by way of limitation, the block ciphers may include AES, Serpent, Speck, Simon, ARIA, MARS, Camellia, and/or Twofish. In other words, the block ciphers may be part of a cipher suite, which includes a plurality of block ciphers available for use by the multi-stage data protection scheme. As an option, the cipher suite is stored within a data store and allows a user (or administrator) to select which of the block ciphers (all or some) are permitted for use by the multi-stage data protection scheme. This provides enhanced flexibility and security by allowing an administrator to update, substitute, add, remove or deactivate (i.e., prevent further use of) a block cipher from the cipher suite based on customer preferences, compromised ciphers, newly released (and more secure) ciphers, or the like.

Lastly, the terms "or" and "and/or" as used herein are to be interpreted as inclusive or meaning any one or any combination. Therefore, "A, B or C" or "A, B and/or C" may mean any of the following: "A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General Architecture

Referring to FIG. 1, a first exemplary embodiment of a computing device 100 deploying multi-stage encryption logic 105 is shown. Herein, the computing device 100 features a communication interface 110, a processor 115, a random number generator "RNG" (e.g., a True Random Number Generator (TRNG) or a Computationally Secure Pseudo-Random Number Generator (CSPRNG)) 120, and a memory 125 (e.g., volatile storage and/or non-volatile storage). As shown, according to this embodiment, the multi-stage encryption logic 105 is stored within the memory 125 and is configured to produce an output ciphertext 112 upon performing multiple encryption stages on incoming plaintext 111. More specifically, the multi-stage encryption logic 105 applies multiple layering, segmentation and encryption cycles on incoming plaintext 111 and resulting ciphertext to produce the output ciphertext 112, as illustrated in FIG. 2 and FIGS. 4A-4F.

According to one embodiment of the disclosure, the multi-stage encryption logic 105 includes (i) segmenting logic 130, (ii) key generation logic 135, (iii) key allocation logic 140, (iv) key management logic 145, (v) cipher allocation logic 150, (vi) cipher management logic 155, (vii) encryption logic 160, and/or (viii) layering logic 165. As shown, each of these logic units may be deployed a software module (or firmware) that operates upon execution by the processor 115, although it is contemplated that some or all of these logic units may be implemented as hardware. Hence, for clarity's sake, the functionality of the above-identified logic will be described without explicit discussion of its execution by the processor 115.

Additionally, a pattern key 170, a key store 180, and a cipher store 185 are accessible by the multi-stage encryption logic 105. Herein, the pattern key 170 operates as a record being an aggregate of meta-information associated with each encrypted segment of a multi-layered, multi-segmented ciphertext forming a portion of the output ciphertext 112. The key store 180 includes a plurality of unique symmetric keys 182, each used for encrypting a segment of binary data associated with the plaintext 111 or a resulting ciphertext, as described below. These symmetric keys 182 may be stored in a protected format (e.g., encrypted or otherwise obfuscated based on data generated from a credential provided by a user of the computing device 100 and/or the encrypted symmetric keys being part of an encrypted volume stored within the key store 180 to provide dual levels of encryption protection). The cipher store 185 includes a cipher suite 188, namely a collection of block ciphers where some or all of these block ciphers may be used for encrypting segments of the binary data. Herein, the key store 180 and the cipher store 185 may be part of secure memory residing within the computing device 100, although it is contemplated that the key store 180 and/or the cipher store 185 may reside within secure memory located external to the computing device 100.

Additionally, according to this embodiment of the disclosure, the memory 125 may include decryption logic 190 operating with the key store 180 and cipher store 185. The decryption logic 190 is configured to recover a pattern key stored within received ciphertext (not shown). The decryption logic 190 uses the recovered pattern key as a guide in controlling the key/cipher selection and in decrypting segments of received ciphertext in order to recover the underlying data obfuscated within the received ciphertext. It is contemplated that the decryption logic 190 is configured to recover the underlying data, provided the decryption logic 190 has access to keying material (e.g., the one or more symmetric keys, etc.) to conduct a first level of decryption to recover the pattern key from the received ciphertext, and thereafter, recover one or more symmetric keys used to encrypt data within the received ciphertext (not shown).

As shown in FIG. 1, the communication interface 110 is configured to receive and provide plaintext 111 to the processor 115, which generates output ciphertext 112 by encrypting the plaintext 111 in accordance with the operations of the multi-stage encryption logic 105 as described below. Additionally, the communication interface 110 may be configured to receive and provide ciphertext to the processor 115 in order to recover underlying data by performing a decryption operation on the ciphertext (being an inverse operation of the encryption operations and illustrated in FIG. 6). According to one embodiment of the disclosure, the communication interface 110 may be configured as a physical port, which receives the plaintext 111 propagating over an interconnect (e.g., wired network, wireless network, cable, etc.) for encryption and subsequent re-transmission or storage as the output ciphertext 112.

The processor 115 may be configured to process a set of instructions that translate the received plaintext 111 into binary data. Thereafter, the processor 115 executes the multi-stage encryption logic 105 to perform multiple (i.e., two or more) processing stages, namely a first processing stage initially on the binary data and one or more subsequent processing stages on resulting (composite) ciphertext in order to generate the multi-layered, multi-segmented ciphertext (see FIG. 4C). Thereafter, the processor 115 is configured to concatenate the pattern key 170 maintained in a data store (not shown) to the multi-layered, multi-segmented ciphertext and generate the output ciphertext 112 by encrypting the multi-layered, multi-segmented ciphertext with the pattern key 170 using an authenticated encryption scheme (e.g., AES operating in GCM (Galois Counter Mode) or AES operating in CCM (Counter Mode with CBC MAC)) to provide the necessary authenticity guarantees.

A. First Processing Stage

According to one embodiment of the disclosure, the multi-stage encryption logic 105 performs a first processing stage to produce a resulting ciphertext (hereinafter, the "first ciphertext"). The first ciphertext operates as a first encryption layer of the output ciphertext 112. It is contemplated that some of the operations conducted by the processing stages (described below) are not described in order to concentrate on certain inventive aspects so that the description is illustrative.

More specifically, the segmenting logic 130 is configured to separate the binary data from the plaintext 111 into a first plurality of equally sized, contiguous segments of binary data (e.g., "N" equally sized, contiguous data segments, where N≥2). In order to provide "N" data segments of equal size, the segmenting logic 130 includes padding logic (not shown) to add bits or bytes of pad data (e.g., logic "1s and 0s") to one of more of the first plurality of data segments as needed so that each segment is divisible by the bitwise length utilized by the block cipher (herein, "cipher block length"). For one deployment, the segmenting logic 130 may be configured to separate the binary data into 256 equally-sized data segments (i.e., N=256 or $2^8$). For other deployments, the segmenting logic 130 may be configured to separate the binary data from the plaintext 111 into any number of equally-sized data segments (e.g., $2^r$ data segments, where r>1 and r≠8). Also, for each data segment, the segmenting logic 130 provides a data segment identifier (Segment_ID) to uniquely identify that data segment. As an illustrative example, the Segment_IDs for "N" data segments may be represented by values "1" to "N," respectively.

Referring still to FIG. 1, the RNG 120 is configured to produce a plurality of cryptographic nonces, namely random bit values that correspond in number to the number (N) of data segments produced by the segmenting logic 130. These nonces are made available to the key generation logic 135, which generates a unique, symmetric key for each data segment of the first plurality of data segments based, at least in part, on each nonce. Stated differently, using each nonce, in total or in part, the key generation logic 135 generates a unique, symmetric key for use in encrypting content within a corresponding segment of binary data. Hence, where the segmenting logic 130 is configured to separate the binary data into 256 equally-sized data segments, the key generation logic 135 generates 256 unique symmetric keys for use in encrypting content associated with the 256 data segments, respectively.

As an illustrative example, the RNG 120 may be configured to generate a first sequence of nonces (e.g., multiple 256-bit values), which are used by the key generation logic 135, in total or in part, to generate a corresponding sequence of symmetric keys. Each of these symmetric keys is unique to each other and is generated to encrypt binary data associated with a particular data segment. As an optional operation, to ensure uniqueness of the symmetric keys before usage, the key generation logic 135 may compare nonces generated by the RNG 120 for a particular segment to ensure no duplication for any of these nonces prior to generating and securely storing these symmetric keys within the key store 180 (e.g., encrypting or obfuscating each of the symmetric keys based on data generated from a user or device credential and/or the encrypted (or obfuscated) symmetric keys being part of an encrypted volume stored within the key store 180).

However, according to another illustrative example, the RNG 120 may be configured to generate the first sequence of nonces, where each nonce is modified to produce a symmetric key. For instance, each nonce of the first sequence of nonces may undergo one or more logical operations (e.g., AND, OR, NAND, NOR, XOR, etc.), a mask operation, or other operation(s), to produce a corresponding symmetric key. Herein, each nonce is unique and operates as a "seed" for the key generation logic 135 in deterministically generating a unique symmetric key.

The key management logic 145 is configured to assign an identifier to each symmetric key generated by the key generation logic 135 and maintain the relationship between the assigned identifier and the symmetric key. According to one embodiment of the disclosure, the relationship between an assigned identifier (i.e., Key_ID) and its symmetric key may be maintained by a table, a relational database, or the like. A listing of the Key_IDs for the symmetric keys is provided to the key allocation logic 140 for symmetric key allocation.

In particular, the key allocation logic 140 may be configured to assign which symmetric key is associated with which data segment. Herein, each symmetric key is uniquely assigned to a different data segment of the first plurality of data segments in accordance with any number of selection schemes (e.g., round-robin based on the listing of Key_IDs provided from the key management logic 145, key allocation to each successive data segment being based on order of key generation, cryptographically secure pseudo-random selection without duplication, etc.). Hence, the assigned order of the symmetric keys (corresponding to the selected order of the Key_IDs) is provided to the key management logic 145 which controls storage, within the pattern key 170, of each key identifier with its corresponding data segment.

Besides the first sequence of nonces, the RNG 120 may be further used to randomly generate one or more nonces for use by the cipher allocation logic 150 in selecting each cipher of a plurality of ciphers for use in encrypting content of a particular data segment of the first plurality of data segments. More specifically, the cipher allocation logic 150 is responsible for selecting which specific block cipher, from a plurality of predetermined block ciphers maintained in the cipher store 185, is used for encrypting each data segment. Hence, for each "N" data segments, the cipher allocation logic 150 identifies a particular cipher used to encrypt that data segment.

As a first illustrative example, the cipher store 185 may be configured to maintain the cipher suite 188 that includes a plurality of different block ciphers that are selected to encrypt content within the data segments (e.g., eight different block ciphers). The selection of the block ciphers may be based on (i) the block ciphers being stored as part of the cipher suite (e.g., all block ciphers stored within the cipher store 185) or (ii) a user or administrator selection (e.g., two or more of the eight block ciphers being selected). Through administrator controls 113 (e.g., commands, queries, etc.), the user or administrator may update, substitute, add, remove or deactivate (i.e., prevent current use of) a block cipher from the cipher suite 188 stored in the cipher store 185.

The cipher allocation logic 150 receives a second sequence of nonces (e.g., "N" selected bit values) from the RNG 120, and based on a particular bit value included within these nonces, assigns a specific block cipher for use in encrypting content within a corresponding data segment. For example, the cipher allocation logic 150 may receive the second sequence of nonces from the RNG 120, where each of the second sequence of nonces includes a 3-bit value (e.g., bit value representing decimal integers between "0" and "7") that identifies one of the eight (8) block ciphers included in the stored cipher suite 188. For each of the "N" 3-bit values, the cipher allocation logic 150 identifies to the cipher management logic 155 a block cipher used to encrypt content within a data segment of the "N" data segments. As another example, the cipher allocation logic 150 may extract a 3-bit value from each of the second sequence of nonces or a single nonce may be generated from which the total number of bits for this nonce would be sufficient for the cipher allocation logic 150 to parse the necessary bit values needed for cipher selection (e.g., 768 bits for 256 data segments and maximum of eight ($2^3$) block ciphers).

The cipher management logic 155 is configured to record a cipher identifier (Cipher_ID) for each data segment within the pattern key 170 and pass such information to the encryption logic 160 to identify which block cipher is used to encrypt each data segment. Hence, for each data segment, the pattern key 170 retains a Segment_ID, a Key_ID, a Cipher_ID and optionally a location ID that identifies a location of the symmetric keys and/or cipher suite if stored external to the computing device 100 (e.g., network address of an enterprise-based data store including the key store 180 and/or cipher store 185).

Referring still to FIG. 1, the encryption logic 160 is configured to conduct encryption operations on each data segment using a corresponding symmetric key and block cipher combination to produce the first ciphertext. As a result, for the first ciphertext, each of the "N" data segments is encrypted with a unique symmetric key using a selected block cipher. The selection of the block cipher may be random or cryptographically secure pseudo-random, as constrained by the block ciphers maintained in the cipher store 185. The layering logic 165 assists in generating the output ciphertext 112 by providing the first ciphertext, which corresponds to a first encryption layer in a multi-layered encryption scheme, as binary data for processing by the segmenting logic 130 in a second processing stage.

B. Second (or Subsequent) Processing Stage(s)

According to one embodiment of the disclosure, the multi-stage encryption logic 105 performs at least a second processing stage to produce a resulting ciphertext (hereinafter, the "second ciphertext"). The second ciphertext constitutes the second encryption layer, which is formed by encrypting, using block ciphers, segments of first ciphertext operating as the first encryption layer without a need to retain the first ciphertext. Hence, where the multi-stage encryption logic 105 performs only two processing stages, the output ciphertext 112 is partially based on an encrypted representation of the second ciphertext.

At the start of the second processing stage, the segmenting logic 130 separates binary data of the first ciphertext into a second plurality (N) of equally sized, contiguous segments (hereinafter, "ciphertext segments"), which correspond in size and number to the first plurality of data segments described above. It is contemplated, where the output ciphertext 112 is produced through iterative processing stages involving more than two encryption layers of ciphertext, the most recently generated ciphertext is provided to the segmenting logic 130 as input data for forming another encryption layer for the multi-layered, multi-segmented ciphertext. Also, for each ciphertext segment, the segmenting logic 130 provides a Segment_ID to uniquely identify that ciphertext segment. For instance, the Segment_IDs for "N" ciphertext segments may be represented by value "N+1" to "2N," respectively.

As shown in FIG. 1, the RNG 120 is configured to produce a plurality of cryptographic nonces, corresponding in number (N) to the ciphertext segments produced by the segmenting logic 130. These nonces are made available to the key generation logic 135, which generates a unique, symmetric key for each ciphertext segment. The key management logic 145 is configured to assign an identifier to each symmetric key associated with a ciphertext segment (Key ID) and maintain the relationship between this assigned identifier and the symmetric key. Likewise, the key allocation logic 140 is configured to assign which symmetric key of the plurality of keys is associated with which ciphertext segment. Herein, each symmetric key is uniquely assigned to a different ciphertext segment and the key management logic 145 controls storage, within the pattern key 170, of each Key_ID with its corresponding ciphertext segment.

As described above, using the RNG 120, the cipher allocation logic 150 selects each cipher of a plurality of ciphers used to encrypt content of a ciphertext segment of the "N" ciphertext segments, provided aligning segments are not allocated the same cipher. For instance, where the binary data of the plaintext 111 and binary data of the first ciphertext are separated into "N" (256) segments, the cipher used for encrypting the first (or second, third, etc.) data segment in the first encryption layer is different than the cipher used for encrypting the first (or second, third, etc.) ciphertext segment in the second encryption layer.

The cipher management logic 155 is configured to record a cipher identifier (Cipher_ID) for each ciphertext segment within the pattern key 170 and pass information to the encryption logic 160 to identify which block cipher to use for encrypting each corresponding ciphertext segment. Hence, for each data segment and ciphertext segment, the pattern key 170 includes an entry to retain the Segment_ID, the Key_ID, the Cipher_ID and optionally the location ID, as described above.

Referring still to FIG. 1, the encryption logic 160 is configured to conduct encryption operations on each ciphertext segment using a corresponding symmetric key and block cipher combination for that data segment to encrypt content within that ciphertext segment and produce the second ciphertext. As a result, for the second ciphertext, each ciphertext segment is encrypted using a unique symmetric key and a randomly selected block cipher that does not match the block cipher used to encrypt the content of the data segment from which that ciphertext segment is produced. The layering logic 165 may continue to form the output ciphertext 112, depending on whether the second ciphertext is to operate as input data for another processing stage or as the resultant multi-layered, multi-segmented ciphertext. Once all of the iterative processing stages are complete, the multi-layered, multi-segmented ciphertext (resulting from at least encrypting the original plaintext, and then encrypting the result of this first encryption that produced the first ciphertext as shown in FIGS. 4A-4D below) is concatenated with the pattern key 170 and this composite ciphertext, consisting of the encrypted segments and the pattern key, is encrypted in accordance with using an authenticated encryption scheme (e.g., AES operating in Galois Counter Mode or AES operating in CCM (Counter Mode with CBC MAC)) to produce the output ciphertext 112.

Figure 2:
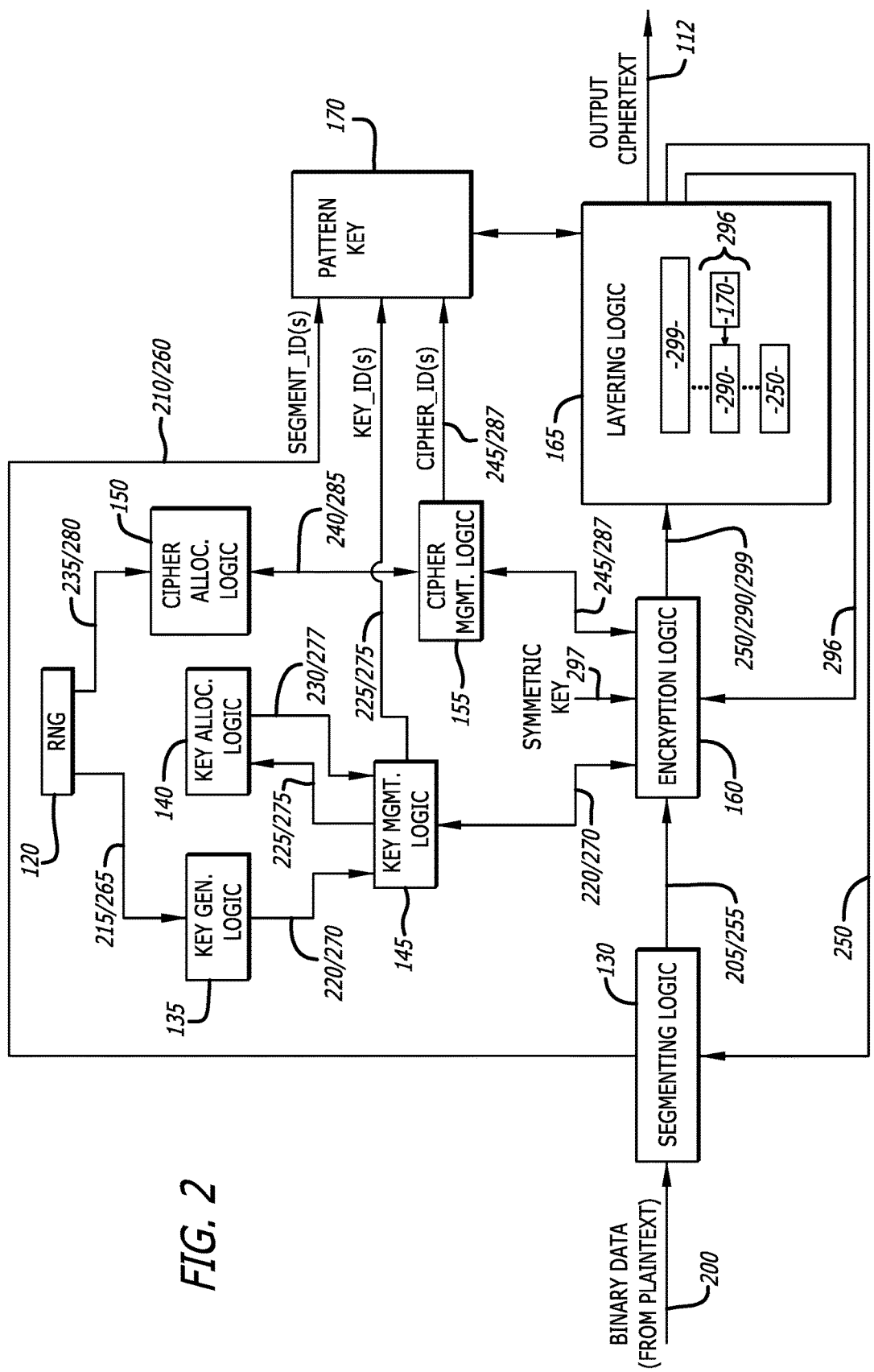
FIG. 2 is an exemplary block diagram of the logical architecture of the multi-stage data protection logic of FIG. 1.

Referring now to FIG. 2, an exemplary block diagram of the logical architecture of the multi-stage encryption logic 105 of FIG. 1 is shown. As described above, the segmenting logic 130 is configured to separate the binary data 200 (from the plaintext 111 of FIG. 1) into "N" equally sized, contiguous data segments 205. The data segments 205 are provided to the encryption logic 160. Also, the segmenting logic 130 provides Segment_IDs 210 for each of the data segments 205 to the pattern key 170.

Operating concurrently (i.e., at least partially overlapping in time) or subsequent to the segmenting of the binary data 200 by the segmenting logic 130, the RNG 120 is activated to produce "N" nonces 215, namely random bit values corresponding in number to the "N" data segments 205. Based on each nonce 215, the key generation logic 135 generates a unique, symmetric key that is used for encrypting content within a corresponding data segment of the "N" data segments 205. Hence, using each of the "N" nonces 215, in total or in part, the key generation logic 135 generates "N" unique, symmetric keys 220.

Operating concurrently with the key generation logic 135, the key management logic 145 assigns a Key_ID 225 for each symmetric key 220 generated by the key generation logic 135 and maintains the relationship between each assigned Key_ID and its counterpart symmetric key. The Key_IDs 225 for the "N" symmetric keys 220 are provided to the key allocation logic 140 for symmetric key allocation to produce a listing 230, which includes an assigned order of each of the "N" symmetric keys 220 for use in encrypting content within each of the "N" data segments 205. As a result, the assigned order of the "N" symmetric keys (Key_IDs), which identifies which symmetric keys are applied to which successive data segments 205, is provided to the key management logic 145. The key management logic 145 provides the Key_IDs 225 to the pattern key 170 for storage with its corresponding data segment while the "N" symmetric keys 220 are made available to the encryption logic 160.

Operating concurrently or subsequent to the allocation of the "N" symmetric keys by the key allocation logic 140, the RNG 120 is further used to randomly generate one or more nonces 235, which are available to the cipher allocation logic 150. The cipher allocation logic 150 selects a specific block cipher, from a plurality (M) of block ciphers 240 maintained in the cipher store 185, for encrypting content within each particular data segment. Hence, for each of the "N" data segments 205, the cipher allocation logic 150 assigns one of the block ciphers 240 to encrypt content within the corresponding data segment 205 and identifies that cipher by a cipher identifier (Cipher_ID) 245.

The cipher management logic 155 is configured to record the cipher identifier (Cipher_ID) 245 for each data segment within the pattern key 170 and pass the Cipher_IDs 245 to the encryption logic 160, which identify the type and order of the "M" block ciphers 240 for use in encrypting each of the corresponding "N" data segment 205. Hence, for each encrypted data segment, the pattern key 170 retains its Segment_ID to identify its position within the "N" data segments 205, a Key_ID to identify the symmetric key used for encrypting content within that data segment, a Cipher_ID to identify the block cipher used for encrypting content within that data segment, and optionally a location ID that identifies a location of the symmetric keys and/or cipher suite if stored external to the computing device 100.

Receiving the "N" data segments 205 and the cipher/symmetric key combinations for each of the "N" data segments 205, the encryption logic 160 encrypts the content contained in each of the "N" data segments 205 to produce the first ciphertext 250. As a result, for the first ciphertext 250, each of the "N" data segments 205 is encrypted by using one of the "N" unique symmetric keys 220 and a selected block cipher 240. The layering logic 165 commences formation of the output ciphertext 112 using the first ciphertext 250 as the first encryption layer and returns at least the first ciphertext 250 as binary data for processing by the segmenting logic 130.

Upon receipt of the first ciphertext 250, the segmenting logic 130 separates the first ciphertext 250 into "N" equally sized, contiguous ciphertext segments 255, which correspond in size and number to the "N" data segments 205 processed in the prior iteration. Also, for each ciphertext segment 255, namely the N+1$^{th}$ segment to the 2N$^{th}$ segment for the output ciphertext 112, the segmenting logic 130 provides the Segment_IDs 260 for these ciphertext segments 255 for storage as part of the pattern key 170.

As described above, operating concurrently or subsequent to the segmenting of the first ciphertext 250, the RNG 120 produces "N" additional nonces 265, namely random bit values corresponding in number to the "N" ciphertext segments 255. Based on each nonce 265, the key generation logic 135 generates a unique, symmetric key that is used for encrypting content within a corresponding ciphertext segment of the "N" ciphertext segments 255. Hence, using each of the "N" nonces 265, in total or in part, the key generation logic 135 generates another "N" unique, symmetric keys 270.

Operating concurrently with the key generation logic 135, the key management logic 145 assigns Key_IDs 275 for the symmetric keys 270 generated by the key generation logic 135 and maintains the relationship between each assigned Key_ID and its corresponding symmetric key. The key allocation logic 140 uniquely assigns one of the "N" symmetric keys 270 to encrypt content within one of the "N" ciphertext segments 255 and may return a listing 277 (assigned order of each of the "N" symmetric keys 270). The key management logic 145 uses the listing 277 to provide the Key_IDs 275 to the pattern key 170 for storage with its corresponding data segment and "N" symmetric keys 270 are provided to the encryption logic 160.

Operating concurrently or subsequent to the allocation of the "N" symmetric keys 270 by the key allocation logic 140, the RNG 120 is further used to randomly generate one or more nonces 280, which are available to the cipher allocation logic 150. The cipher allocation logic 150 selects a specific block cipher, from the plurality (M) of block ciphers 240 (e.g., M≥2) maintained in the cipher store 185, for encrypting each particular ciphertext 255. Hence, for "N" ciphertext segments 255, the cipher allocation logic 150 produces "N" cipher values 285, which identifies to the cipher management logic 155 one of the block ciphers 240 used to encrypt the corresponding "N" ciphertext segments 255. It is noted, however, that the selected block cipher for each of the "N" ciphertext segments 255 is different than the cipher used to generate that ciphertext segment (i.e., vertically aligned segments of the multi-layered, multi-segmented ciphertext are different).

The cipher management logic 155 is configured to record (within the pattern key 170) a cipher identifier (Cipher_ID) 287 for each ciphertext segment and pass information that identifies which of the "M" block ciphers 287 for use in encrypting each corresponding "N" ciphertext segment 255. Hence, for each encrypted ciphertext segment, the pattern key 170 retains its Segment_ID to identify its position within the "N" ciphertext segments 255, a Key_ID 275 to identify the symmetric key used for encrypting content within that ciphertext segment 255, a Cipher_ID 287 to identify the block cipher used for encrypting content within that ciphertext segment 255, and optionally the location ID (when stored remotely such as within an enterprise data store).

Receiving the "N" ciphertext segments 255 and the cipher/symmetric key combinations 270 for each of the "N" ciphertext segments 250, the encryption logic 160 encrypts the content contained in each of the "N" ciphertext segments 250 to produce the second ciphertext 290. As a result, for the second ciphertext 290, each of the "N" ciphertext segments 255 is encrypted with one of the "N" unique symmetric keys 270 and a selected block cipher 285 from the cipher suite. The layering logic 165 commences formation of the output ciphertext 112 using the second ciphertext 290 as a second encryption layer.

Herein, if the output ciphertext 112 includes more than two layers of ciphertext, the second ciphertext 290 is provided to the segmenting logic 130 and another processing stage is conducted. These operations continue for each ciphertext layer forming the multi-layered, multi-segmented ciphertext 295. Once the iterative processing stages have completed, the multi-layered, multi-segmented ciphertext 295 (e.g., all encrypted segments composing the second ciphertext 290, which results from encrypting all encrypted segments composing the first ciphertext 250) is concatenated with the pattern key 170 to produce a composite ciphertext 296. For this embodiment, the pattern key 170 is concatenated to a predetermined portion of the multi-layered, multi-segmented ciphertext 295 (e.g., before the first segment of the second ciphertext 290, after the last segment of the second ciphertext 290, etc.) and the resulting, composite ciphertext 296 is provided to the encryption logic 165 for encryption in accordance with using an authenticated encryption scheme (e.g., AES operating in GCM) using a key 297 selected by a user to produce an encrypted unitary ciphertext (upper (third) encryption layer) 299. As shown, the third encryption layer 299, based on the composite ciphertext 296, operates as the output ciphertext 112.

Figure 3:
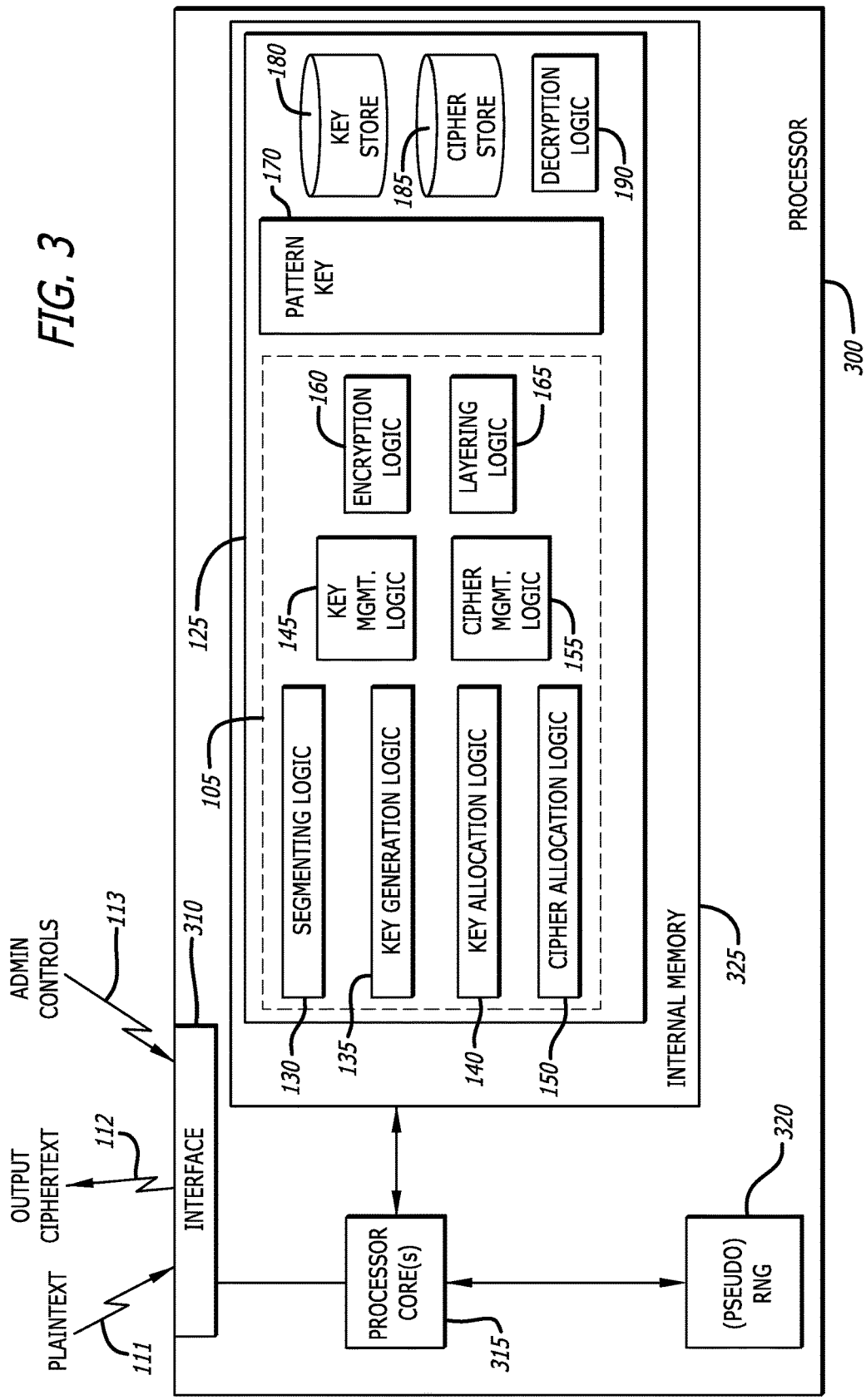
FIG. 3 is a second exemplary embodiment of a computing device deploying the multi-stage data protection logic.

Referring to FIG. 3, a second exemplary embodiment of a processor 300 implemented with the multi-stage encryption logic 105 is shown. Herein, the processor 300 features an interface 310, one or more processor cores 315, a random number generator (RNG) 320, and an internal memory 325 (e.g., volatile storage and/or non-volatile storage). As shown, according to this embodiment, the multi-stage encryption logic 105 is stored within the internal memory 325 and is configured to produce an output ciphertext 112 through multiple segmentation, encryption and layering cycles performed on incoming plaintext 111. The resultant, composite ciphertext is generated in the manner as described above and illustrated in FIGS. 4A-4F.

Figure 4A:
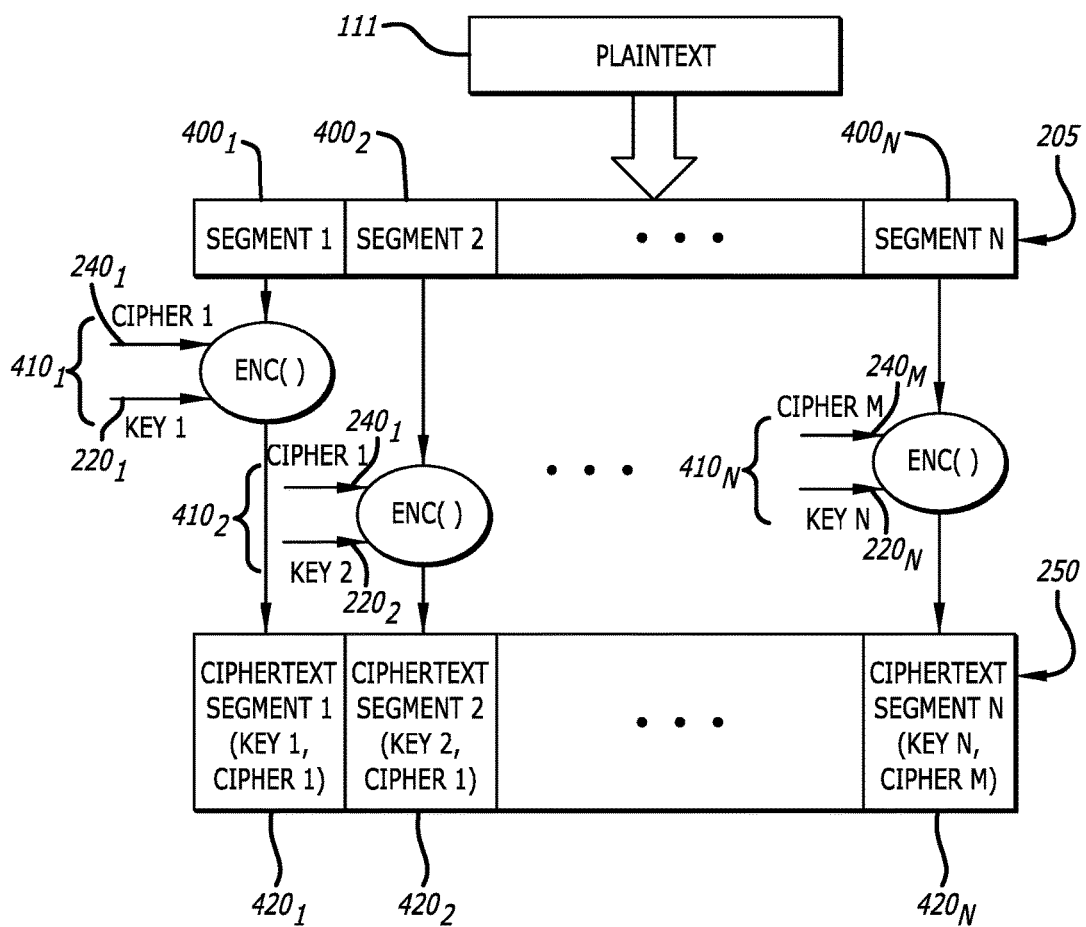
FIGS. 4A-4F are illustrative block diagrams of the multi-stage data protection logic of FIG. 1 and FIG. 3.

Referring to FIGS. 4A-4F, illustrative block diagrams of the operations performed by the multi-stage encryption logic 105 of FIG. 1 and FIG. 3 is shown. Herein, the multi-stage encryption logic 105 employs segmentation, encryption and layering to achieve security improvements. As shown in FIG. 4A, the plaintext 111 being encrypted under the multi-stage data protection scheme is segmented into "N" (e.g., "N" being a positive real number such as 256) equally sized, contiguous segments 205, which are illustrated as a first segment $400_1$ to an $N^{th}$ segment $400_N$. The actual size of each segment $400_1$-$400_N$ may depend on the size of the original plaintext 111 (e.g., a message, a file, etc.). Padding may be used to ensure that each segment $400_1$-$400_N$ is of equivalent size and divisible by the selected cipher block length.

A specific key/cipher combination $410_1$-$410_N$ is randomly allocated to each segment $400_1$ . . . , or $400_N$. Each specific key/cipher combination $410_1$-$410_N$ includes a unique P-bit cryptographic key (e.g., "P" being a positive real integer such as 256) $220_1$-$220_N$ and any one of the block ciphers $240_1$ . . . or $240_M$ in the cipher suite. Each segment $400_1$ . . . , or $400_N$ is then encrypted (using cipher block chaining "CBC" mode) in accordance with the specific key/cipher combination $410_1$-$410_N$ respectively, which produces the first ciphertext 250. The first ciphertext 250 includes ciphertext segments $420_1$-$420_N$ and is positioned as a first encryption layer of a multi-layered, multi-segmented ciphertext 295 (see FIG. 4C).

Figure 4B:
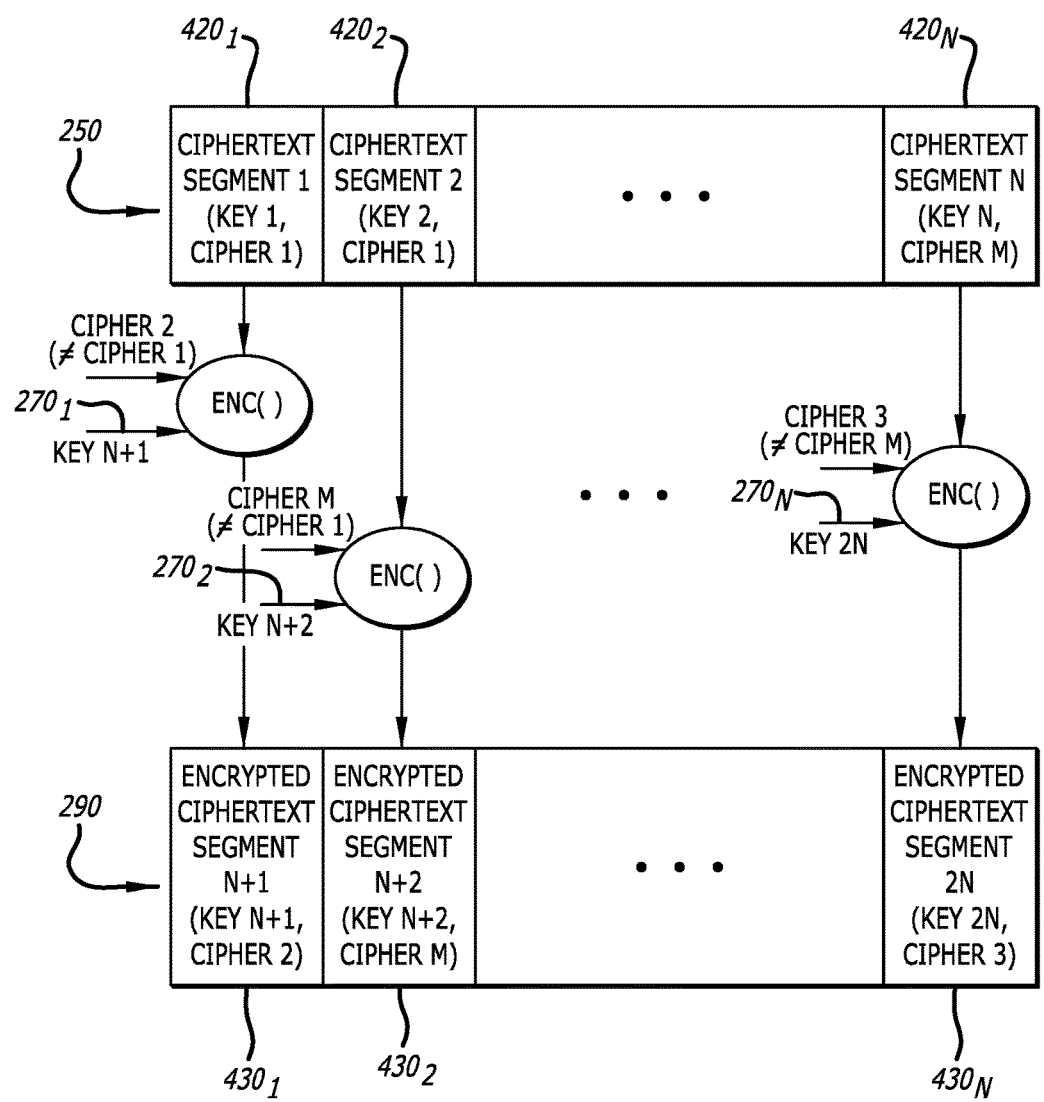

Referring to FIG. 4B, the first ciphertext 250 is then subjected to a second cycle of segmentation, encryption and layering using the same process as described, but with different independent keys for each segment and different ciphers chosen for each vertically aligned segment when fallback security is desired. For instance, aligning segments (e.g., (ciphertext segment $420_1$; encrypted ciphertext segment $430_1$) . . . , (ciphertext segment $420_N$; encrypted ciphertext segment $430_N$)) are not encrypted using the same block cipher. As an illustrative example, ciphertext segment $420_1$ is encrypted using a first block cipher $240_1$ while the encrypted ciphertext $430_1$ is encrypted using a second block cipher $240_2$. Ciphertext segment $420_2$ is encrypted using the first block cipher $240_1$ while the encrypted ciphertext $430_2$ is encrypted using an $M^{th}$ block cipher $240_M$.

Figure 4C:
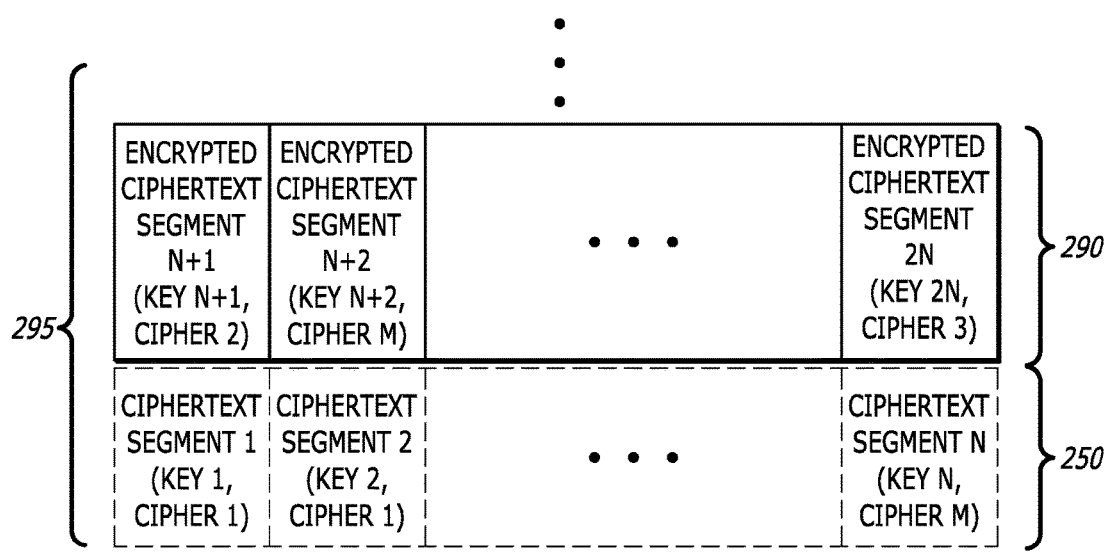

As illustrated in FIG. 4C, at the conclusion of the second processing stage (i.e., the last processing cycle for this illustrative embodiment), the multi-layered, multi-segmented ciphertext 295 is produced. The second ciphertext 290 corresponds to the multi-layered, multi-segmented ciphertext 295. However, for completeness, a logical representation of all of the encryption layers involved in the formation of the multi-layered, multi-segmented ciphertext 295, namely the second ciphertext 290 and the first ciphertext 250, is shown. The first ciphertext 250 is represented as a faded image to denote that this data has been used to produce the second ciphertext 290.

Figure 4D:
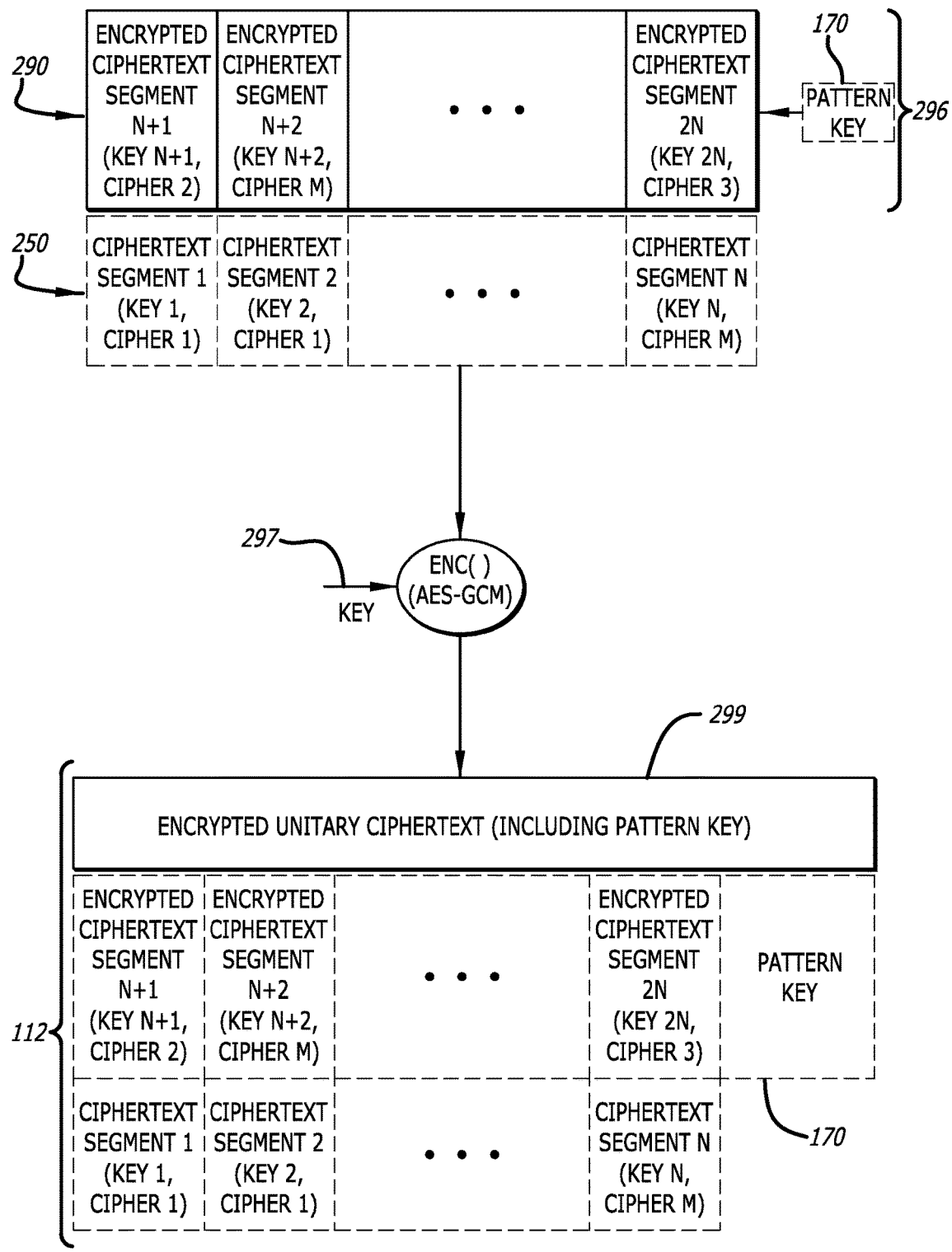

As shown in FIG. 4D, the multi-layered, multi-segmented ciphertext 295 is concatenated with the pattern key 170, which indicates the lengths of each segment and other meta-information (e.g., Key_ID and Cipher_ID associated with each Segment_ID). As shown, the pattern key 170 is concatenated with an $2N^{th}$ segment of the second ciphertext 290 and this composite ciphertext 296, namely the second ciphertext 290 and the pattern key 170, is provided to the encryption logic 165 for encryption encrypted in accordance with using an authenticated encryption scheme (e.g., AES operating in GCM) using a selected symmetric key 297 to produce the output ciphertext 112. For completeness, a logical representation of the output ciphertext 112, namely the third encryption layer 299 (i.e., encrypted unitary ciphertext), is shown where the first and second encryption layers (i.e., first ciphertext and composite ciphertext) are represented as a faded image to denote that this ciphertext has been utilized to produce the output ciphertext 112.

Figure 4E:
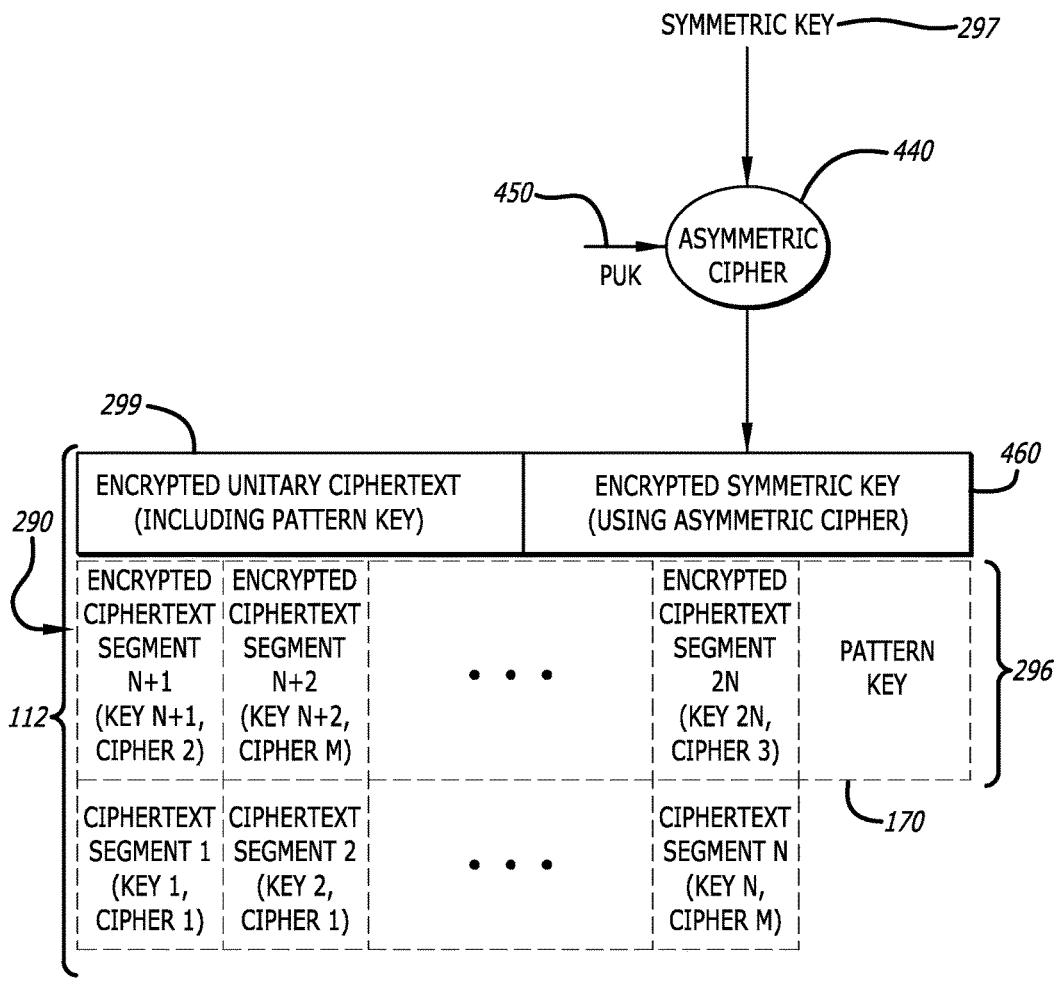
Figure 4F:
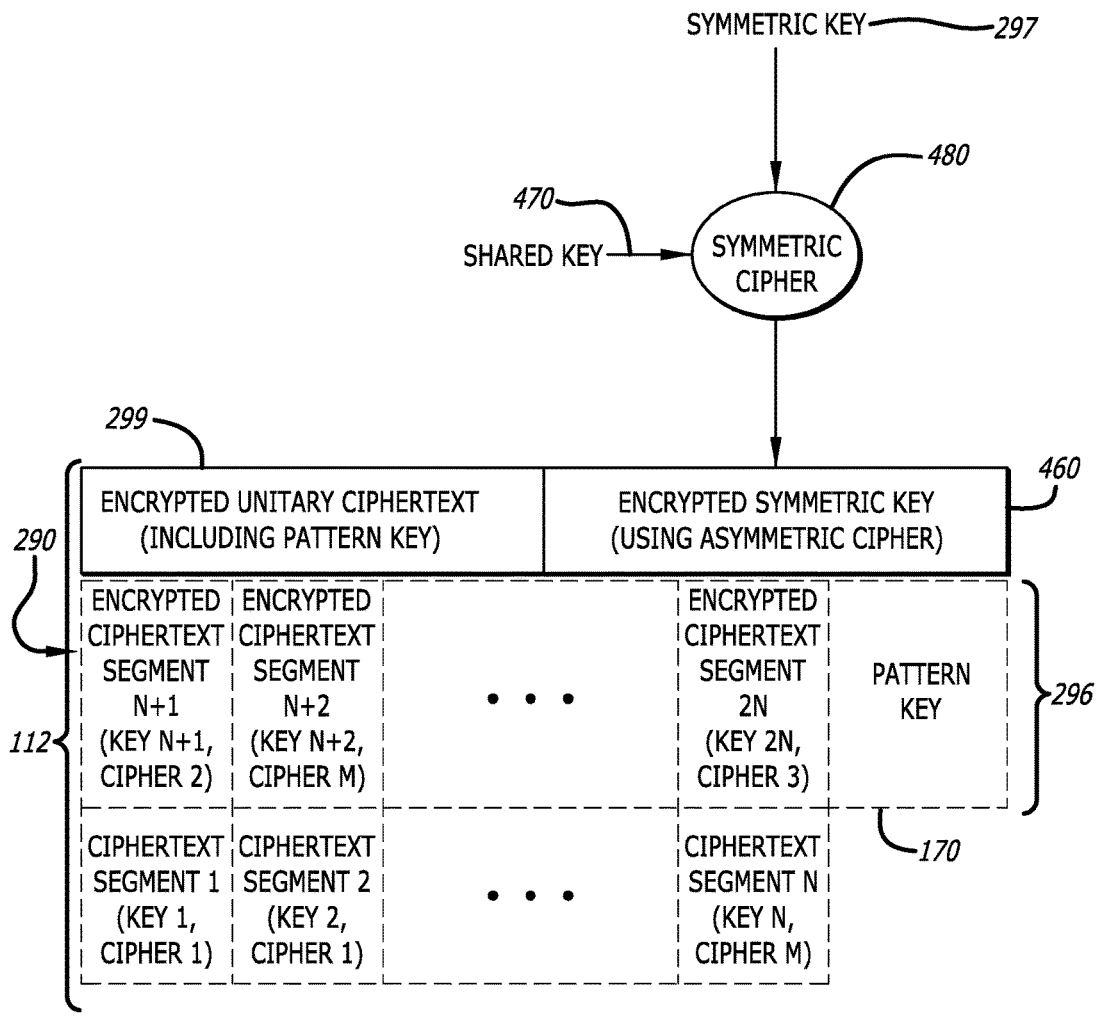

Referring now to FIGS. 4E-4F, it is contemplated that, if the output ciphertext 112 is to be transmitted over a network, an additional encryption layer may be required. One or more asynchronous technique(s) and/or synchronous technique(s) may be utilized for key distribution to recover content within the additional encryption layer of the ciphertext 112 at a remote source. More specifically, as illustrative examples, an asynchronous technique may include the use of an asymmetric key cipher to encrypt information (e.g., symmetric key 297) that, upon recovery, may be used to obtain additional content (e.g., pattern key 170) assisting in the recovery of the plaintext 111 as described below. A synchronous technique may be directed to a key agreement methodology such as a shared key exchange (e.g., Diffie-Hellman key exchange). The shared key may be used for enhanced security during transmission of the ciphertext 112.

In FIG. 4E, for an asymmetric key cipher deployment, the output ciphertext 112 is concatenated with an encrypted symmetric key 460. This symmetric key 297 is encrypted with an asymmetric cipher 440 using a public key (PUK) 450 of a targeted recipient. The encrypted symmetric key 460, along with the encrypted unitary ciphertext (third encryption layer) 299, are provided to the recipient. The recipient uses its private key (PRK) to recover the encrypted symmetric key 297, which is used to recover content within the encrypted unitary ciphertext (third encryption layer) 299 such as the pattern key 170 and second encrypted layer 290 of FIG. 4D. Again, for completeness, a logical representation of the output ciphertext 112, namely the third encryption layer 299 (i.e., encrypted unitary ciphertext) with the encrypted symmetric key 460, is shown. The first ciphertext and composite ciphertext are represented as a faded image to denote that such ciphertext has been utilized to produce the output ciphertext 112.

Referring additionally to FIGS. 1-2 & 4, based on content of the pattern key 170, plaintext content from the encrypted segments within the composite ciphertext 296 may be recovered. With the key store 180 and/or the cipher store 185 residing at an external location (e.g., key store 180 accessible within an enterprise network after user authentication), the recipient (authenticated to access the enterprise key store), would be able to access the symmetric keys 220 and 270 and determine which block ciphers 240 to use for each of the segment $420_1$-$420_N$ and $430_1$-$430_N$ in accordance with the pattern key 170. Hence, the asynchronous technique provides suitable enhanced security, especially for communications where the source and the targeted recipient are not actively communicating (e.g., electronic mail messages, etc.).

For a shared key exchange deployment, as shown in FIG. 4F, a shared key 470 is established between the source and the targeted recipient. The shared key 470 is a symmetric key that may be generated through a shared key generation scheme (e.g., Diffie-Hellman) or agreed upon based on an out-of-band transmission such as an email message, phone call, text message, or the like. Using the shared key 470 and a selected symmetric key cipher 480, the symmetric key 297 is encrypted. The encrypted symmetric key 490, along with the third encryption layer 299 and the composite ciphertext 296, are provided to the recipient. The shared key is used to recover content within the third encryption layer 299 (e.g., pattern key 170 of FIG. 4D) and the composite ciphertext 296. The targeted recipient may have access to the unique symmetric keys used to generate the segments of the composite ciphertext 296 (e.g., part of an enterprise key store as described above or encrypted with the shared key).

Figure 5A:
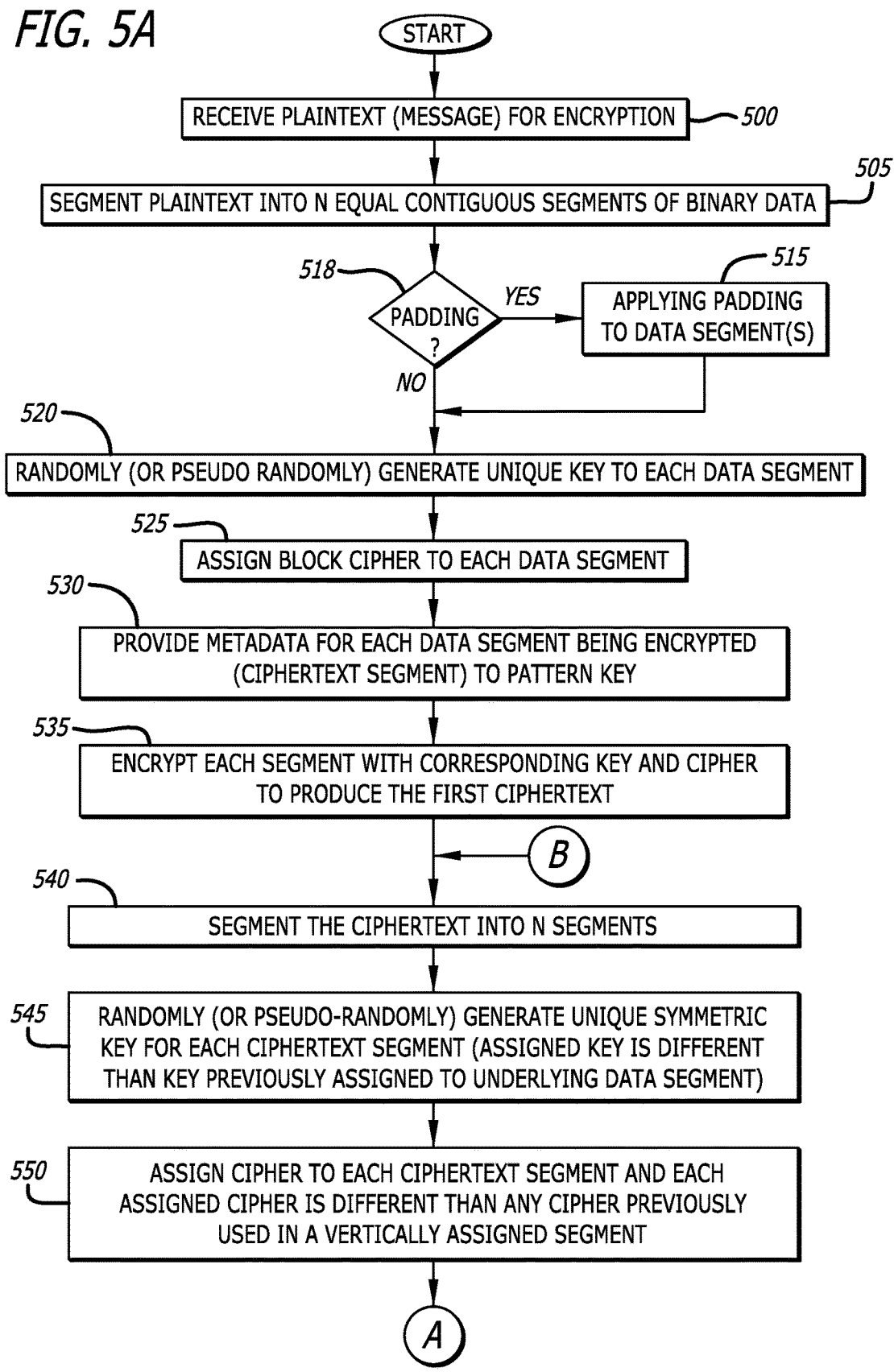
FIGS. 5A-5B are illustrative flowchart of the operations conducted by the multi-stage data protection logic of FIG. 1 and FIG. 3 for generating ciphertext for secured storage or transmission.
Figure 5B:
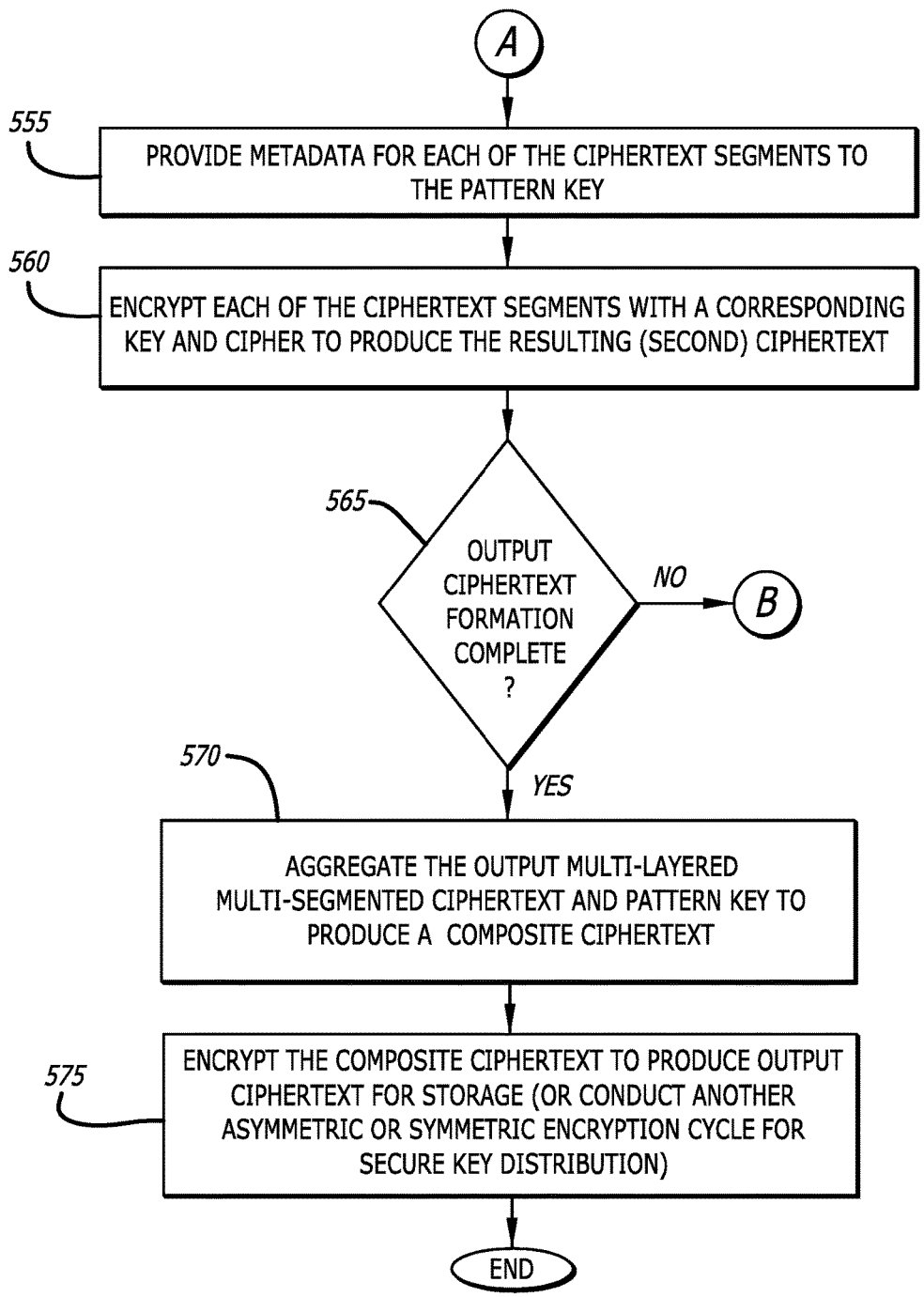

Referring to FIGS. 5A-5B, illustrative flowcharts of the operations conducted by the multi-stage encryption logic 105 of FIG. 1 and FIG. 3 is shown. According to one embodiment of the disclosure, a message (plaintext) is received for encryption (block 500). Content from the message (binary data) is separated into a first plurality (N) of equally sized, contiguous segments of binary data (block 505). During this segmentation, padding may be applied to one or more of the N segments to formulate the "N" equally-sized data segments divisible by the selected cipher block length such as 128-bits, 256-bits or the like (blocks 510 and 515).

Operating concurrently or subsequent to the segmenting of the binary data, unique, symmetric keys are randomly (or cryptographically secure pseudo randomly) generated for each segment (block 520). For this embodiment, N unique, symmetric keys are generated, where each symmetric key is assigned for use in encrypting content within a data segment of the N data segments. Similarly, operating concurrently or subsequent to the generation of the symmetric keys, for each segment, a block cipher from a prescribed group of block ciphers is selected for use in encrypting that segment (block 525). According to one embodiment, the block cipher for each segment may be selected randomly (or cryptographically secure pseudo randomly) from the group of block ciphers, where a subgroup of these ciphers may be actively used for current cryptographic operations while other ciphers may be legacy ciphers (i.e., retained for decryption and perhaps subsequent re-encryption using one or more different block ciphers where one of the used cipher is determined to be compromised or less effective than desired).

Referring still to FIG. 5A, each segment is encrypted with an assigned key and block cipher combination to produce a first ciphertext (block 535). Herein, the first ciphertext operates as a first encryption layer for the output ciphertext. The first encryption layer is used to securely store or transmit the plaintext. During assignment of the unique symmetric key and block cipher for each segment, however, the metadata associated with such assignments is provided to the pattern key (block 530). The pattern key operates as a record to maintain identifiers for the symmetric key and block cipher used for encryption of the content within each data segment. The pattern key is relied upon for decryption of the output ciphertext. Hence, at this point in generation of the output ciphertext, the pattern key would have meta-information associated with the block cipher/symmetric key associated with each of the N segments.

As the output ciphertext includes at least a second encryption layer, the first ciphertext is separated into a second plurality (N) of equally sized, contiguous segments of portions of the ciphertext being treated as binary data (block 540). Although not shown, during this segmentation process as well, padding may be applied to one or more of the N segment to formulate the "N" equally-sized ciphertext segments.

Operating concurrently or subsequent to the segmenting of the first ciphertext, unique, symmetric keys are randomly (or cryptographically secure pseudo randomly) generated for each ciphertext segment (block 545). For this embodiment, N additional symmetric keys are randomly (or cryptographically secure pseudo-randomly) generated, where each additional symmetric key is assigned for use in encrypting content within a ciphertext segment of the N ciphertext segments. Similarly, operating concurrently or subsequent to the generation of the additional symmetric keys, for each ciphertext segment, a block cipher from a prescribed group of block ciphers is selected for use in encrypting that ciphertext segment (block 550). However, for each iterative processing stage in creating an encryption layer for the output ciphertext, if fallback security is desired, each vertically aligned segment is encrypted using a different block cipher. Stated different, the block cipher selected to encrypt the ciphertext segment is different than a cipher used to generate that ciphertext segment (as well as any other ciphertext segments derived therefrom).

Thereafter, as shown in FIG. 5B, each ciphertext segment is encrypted with an assigned key and block cipher combination to produce a second ciphertext (block 560). Herein, the second ciphertext operates as a second encryption layer for output ciphertext being used to securely store or transmit the plaintext. During assignment of the unique symmetric key and block cipher for each ciphertext segment, however, the metadata associated with such assignments is also provided to the pattern key (block 555). Hence, at this point in generation of the output ciphertext, the pattern key would have metadata associated with the block cipher/symmetric key associated with 2N segments.

Thereafter, a determination is made whether the output ciphertext is structured to be resultant ciphertext produced from more than two encryption layers (block 565). If so, the second ciphertext is segmented as described in block 535 and the operations for generation of a third or subsequent ciphertext is conducted in a manner as described in blocks 540-560.

Once a formation of the multi-layered, multi-segmented ciphertext is complete, such as the second ciphertext being the second encryption layer and operating as the multi-layered, multi-segmented ciphertext, a composite ciphertext is formed by including the pattern key with the multi-layered, multi-segmented ciphertext (block 570). As shown in FIG. 4D, the pattern key may be concatenated to an NI ciphertext segment for the last encryption layer (e.g., the segmented, second ciphertext encryption layer). Thereafter, the composite ciphertext is encrypted in accordance with using an authenticated encryption scheme (e.g., AES operating in GCM) using a symmetric key to produce the output ciphertext for secure storage or transmission after an asynchronous or synchronous encryption operation performed on keying material as described above (block 575).

Figure 6:
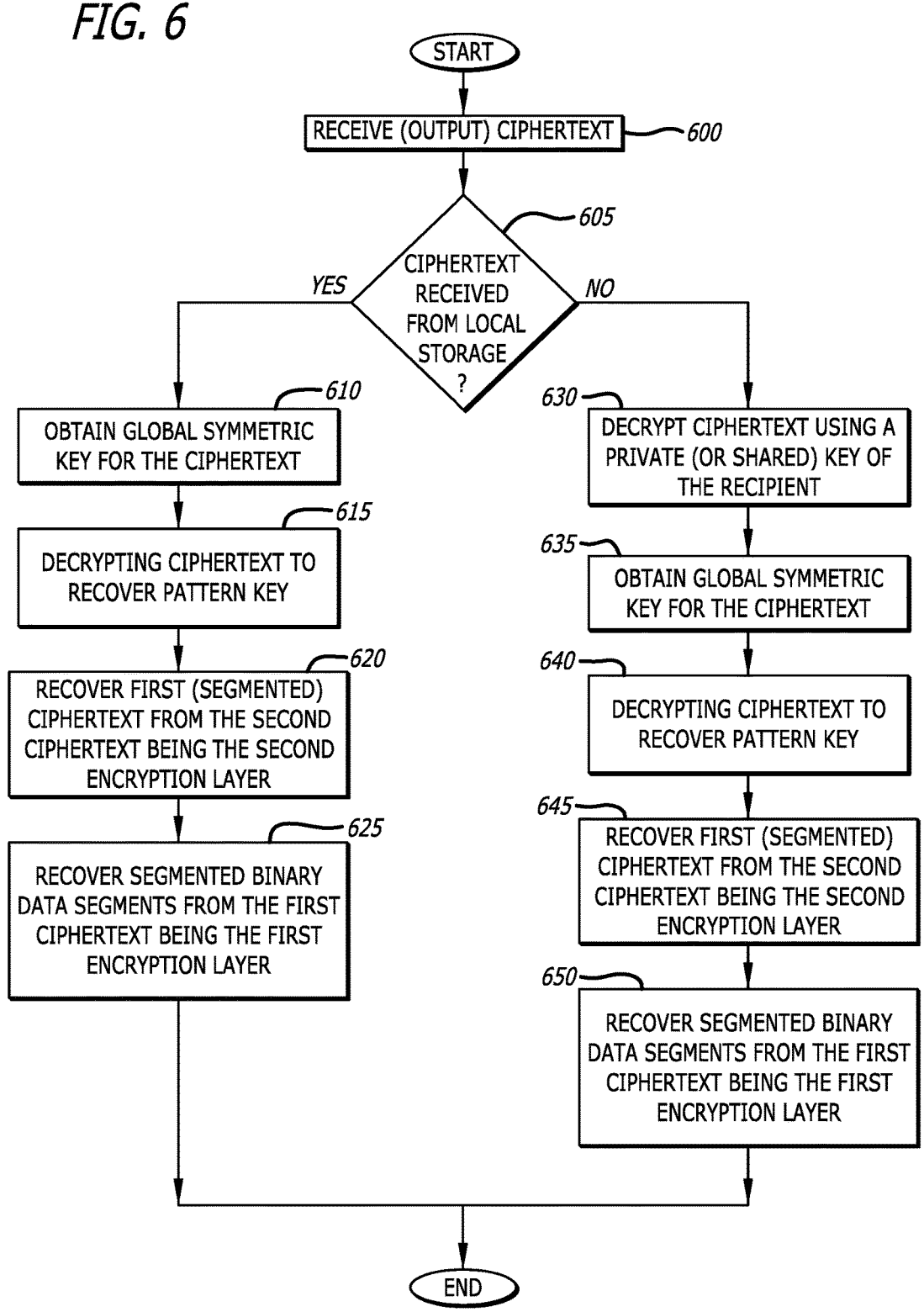
FIG. 6 is an illustrative flowchart of the operations conducted by the multi-stage data protection logic of FIG. 1 and FIG. 3 for recovering plaintext from a received ciphertext encrypted in accordance with the multi-stage data protection scheme.

Referring now to FIG. 6, an illustrative flowchart of the operations conducted by the multi-stage data protection logic of FIG. 1 and FIG. 3 for recovering plaintext from received ciphertext is shown. Herein, upon receipt of ciphertext formatted in accordance with the multi-stage encryption scheme described above, the ciphertext undergoes one or more decryption operations to uncover the pattern key. For this illustrative embodiment, the ciphertext includes a pair of encryption layers with ciphertext and an upper encryption layer as illustrated in FIG. 4D and FIG. 4E.

More specifically, where the ciphertext is received from storage local to the computing device such as a hard disk or non-volatile memory (blocks 600 and 605), the decryption logic obtains a global symmetric key for the ciphertext, which is maintained in a data store (block 610). The global symmetric key may be stored in an encrypted format (e.g., encrypted using credentials as described above). Upon obtaining the global symmetric key, the upper encryption layer of the ciphertext is decrypted to recover the pattern key (block 615). From the pattern key, the decryption logic is able to determine which ciphers and symmetric keys to use to decrypt the content within each segment of the multi-layered, multi-segment ciphertext (block 620). For instance, the decryption logic may recover the first ciphertext from the second ciphertext using the symmetric keys and block ciphers identified in the pattern key.

Thereafter, the decryption logic may recover the segmented binary values associated with the plaintext from the first ciphertext using the symmetric keys and block ciphers identified in the pattern key (block 625). Thereafter, the recovered plaintext is made available to the computing device for further operation (e.g., display, re-encrypt due to a compromised block cipher, etc.).

Where the ciphertext is received over a network connection, according to one embodiment, the decryption logic may be configured to decrypt a portion of a message using a private key assigned to a recipient (e.g., assigned to the user of the computing device or the computing device itself) or a negotiated, shared key. The encrypted portion of the message includes the "global" symmetric key used for encryption of the third (outer) encryption layer (e.g., ciphertext with pattern key), and this portion of the message is encrypted with an asymmetric (public) key of the targeted recipient or the shared key (blocks 630 and 635).

Thereafter, the underlying data associated with the ciphertext may be recovered as described in blocks 610-625 as described above. More specifically, upon obtaining the global symmetric key, the upper encryption layer of the ciphertext is decrypted to recover the pattern key (blocks 635 and 640). From the pattern key, the decryption logic is able to determine which ciphers and symmetric keys to use to decrypt the content within each segment of the multi-layered, multi-segment ciphertext. More specifically, the decryption logic may recover the first ciphertext from the second ciphertext using the symmetric keys and block ciphers identified in the pattern key (block 645), and the decryption logic may recover the segmented binary values associated with the plaintext from the first ciphertext using the symmetric keys and block ciphers identified in the pattern key (block 650). Thereafter, the recovered plaintext is made available to the computing device for further operation.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method comprising:
encrypting each of a plurality of segments of a binary value using a selected block cipher of a plurality of block ciphers and a unique symmetric key of a first plurality of unique, symmetric keys to produce a first ciphertext;
encrypting each of a plurality of segments of the first ciphertext using a selected block cipher of the plurality of block ciphers and a unique symmetric key of a second plurality of unique, symmetric keys to produce a second ciphertext, wherein the selected block cipher used to encrypt a first segment of the binary value to produce a first segment of the plurality of segments of the first ciphertext is different than the selected block cipher used to encrypt the first segment of the first ciphertext to produce a first segment of the second ciphertext and the encrypting of each of the plurality of segments of the first ciphertext comprises aligning the plurality of segments of the first ciphertext with a plurality of segments of the second ciphertext where the first segment of the plurality of segments of the first ciphertext corresponds to the first segment of the second ciphertext, a second segment of the plurality of segments of the first ciphertext corresponds to a second segment of the plurality of segments of the second ciphertext and continuing to associate remaining segments of the plurality of segments of the first ciphertext with remaining segments of the plurality of segments of the second ciphertext;

concatenating a pattern key to a prescribed segment of the plurality of segments of the second ciphertext to produce a composite ciphertext, the pattern key including identifiers of the block ciphers and symmetric keys used to encrypt each of the plurality of segments of the binary value and each of the plurality of segments of the first ciphertext; and encrypting the composite ciphertext using a symmetric key cipher and a selected symmetric key to produce a multi-layered, multi-segmented ciphertext for secure storage within a memory device.

2. The computerized method of claim 1, wherein the encrypting of each of the plurality of segments of the binary value comprises generating a first plurality of unique nonces by a random number generator; and generating each of a first plurality of unique, symmetric keys based on a corresponding nonce of the first plurality of nonces.

3. The computerized method of claim 2, wherein the encrypting of each of the plurality of segments of the binary value further comprises generating a second plurality of unique nonces by the random number generator; and selecting a block cipher of the plurality of block ciphers for each of the plurality of segments of the binary data based on a corresponding nonce of the second plurality of nonces.

4. The computerized method of claim 3, wherein the encrypting of each of the plurality of segments of the first ciphertext comprises generating a third plurality of unique nonces by the random number generator; and generating each of the second plurality of unique, symmetric keys based on a corresponding nonce of the third plurality of nonces.

5. The computerized method of claim 4, wherein the encrypting of each of the plurality of segments of the first ciphertext further comprises generating a fourth plurality of unique nonces by the random number generator; and selecting block ciphers for each of the plurality of segments of the first ciphertext based on a corresponding nonce of the fourth plurality of nonces.

6. The computerized method of claim 1, wherein the encrypting the composite ciphertext further comprises encrypting the selected symmetric key to produce the multi-layered, multi-segmented ciphertext including the encrypted composite ciphertext and the encrypted symmetric key.

7. A system comprising:

a processor; and a memory communicatively coupled to the processor, the memory including one or more software module that, upon execution by the processor, perform operations, including encrypting each of a plurality of segments of a binary value using a selected block cipher of a plurality of block ciphers and a unique symmetric key of a first plurality of unique, symmetric keys to produce a first ciphertext, encrypting each of a plurality of segments of the first ciphertext using a selected block cipher of the plurality of block ciphers and a unique symmetric key of a second plurality of unique, symmetric keys to produce a second ciphertext, wherein the selected block cipher used to encrypt a first segment of the binary value to produce a first segment of the plurality of segments of the first ciphertext is different than the selected block cipher used to encrypt the first segment of the first ciphertext to produce a first segment of the second ciphertext and the second ciphertext being produced by at least aligning the plurality of segments of the first ciphertext with a plurality of segments of the second ciphertext, wherein the first segment of the plurality of segments of the first ciphertext corresponds to the first segment of the second ciphertext, a second segment of the plurality of segments of the first ciphertext corresponds to a second segment of the second ciphertext and remaining segments of the plurality of segments of the first ciphertext corresponding to remaining segments of the plurality of segments of the second ciphertext, concatenating a pattern key to a prescribed segment of the plurality of segments of the second ciphertext to produce a composite ciphertext, the pattern key including identifiers of the block ciphers and symmetric keys used to encrypt each of the plurality of segments of the binary value and each of the plurality of segments of the first ciphertext; and encrypting the composite ciphertext using a symmetric key cipher and a selected symmetric key to produce a multi-layered, multi-segmented ciphertext.

8. The system of claim 7, wherein a software module of the one or more software modules, upon execution by the processor, encrypts each of the plurality of segments of the binary value by at least (i) generating a first plurality of unique nonces by a random number generator, and (ii) generating each of a first plurality of unique, symmetric keys based on a corresponding nonce of the first plurality of nonces.

9. The system of claim 8, wherein a software module of the one or more software modules, upon execution by the processor, encrypts each of the plurality of segments of the binary value by at least (i) generating a second plurality of unique nonces by the random number generator, and (ii) selecting a block cipher of the plurality of block ciphers for each of the plurality of segments of the binary data based on a corresponding nonce of the second plurality of nonces.

10. The system of claim 9, wherein a software module of the one or more software modules, upon execution by the processor, encrypts each of the plurality of segments of the first ciphertext by at least (i) generating a third plurality of unique nonces by the random number generator, and (ii) generating each of the second plurality of unique, symmetric keys based on a corresponding nonce of the third plurality of nonces.

11. The system of claim 10, wherein a software module of the one or more software modules, upon execution by the processor, encrypts each of the plurality of segments of the first ciphertext by at least (i) generating a fourth plurality of unique nonces by the random number generator, and (ii)

selecting block ciphers for each of the plurality of segments of the first ciphertext based on a corresponding nonce of the fourth plurality of nonces.

12. The system of claim 7, wherein the memory further comprises one or more software module that, upon execution by the processor, further perform operations, comprising:

generating an output ciphertext for transmission over a network, the output ciphertext including the encrypted composite ciphertext and an encrypted version of the selected symmetric key to form the multi-layered, multi-segmented ciphertext.

* * * * *